United States Patent
Hwang et al.

(10) Patent No.: US 9,986,590 B2
(45) Date of Patent: May 29, 2018

(54) METHOD FOR CONCURRENTLY ACCESSING PLURALITY OF CELLS AND USER EQUIPMENT

(71) Applicant: LG ELECTRONICS INC., Seoul (KR)

(72) Inventors: Daesung Hwang, Seoul (KR); Yunjung Yi, Seoul (KR); Joonkui Ahn, Seoul (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 14/914,534

(22) PCT Filed: Aug. 11, 2014

(86) PCT No.: PCT/KR2014/007432
§ 371 (c)(1),
(2) Date: Feb. 25, 2016

(87) PCT Pub. No.: WO2015/041410
PCT Pub. Date: Mar. 26, 2015

(65) Prior Publication Data
US 2016/0212786 A1    Jul. 21, 2016

Related U.S. Application Data

(60) Provisional application No. 61/878,616, filed on Sep. 17, 2013.

(51) Int. Cl.
*H04W 4/00* (2018.01)
*H04W 76/02* (2009.01)
(Continued)

(52) U.S. Cl.
CPC ........ *H04W 76/025* (2013.01); *H04B 7/2656* (2013.01); *H04L 5/0053* (2013.01);
(Continued)

(58) Field of Classification Search
CPC .................................................. H04W 76/025
See application file for complete search history.

(56) References Cited

U.S. PATENT DOCUMENTS

2012/0106404 A1    5/2012  Damnjanovic
2012/0275390 A1*  11/2012  Korhonen ........... H04W 74/006
                                                   370/329
(Continued)

FOREIGN PATENT DOCUMENTS

KR    10-2012-0130735 A    12/2012
WO    WO 2013/125860 A      8/2013

OTHER PUBLICATIONS

3GPP TS 36.331 V11.4.0, "3rd Generation Partnership Project;Technical Specification Group Radio Access Network;Evolved Universal Terrestrial Radio Access (E-UTRA);Radio Resource Control (RRC); Protocol specification (Release 11)", (http://www.3gpp.org/DynaReport/36331.htm), Jul. 4, 2013, See section 6.3.4.

*Primary Examiner* — Gerald Smarth
(74) *Attorney, Agent, or Firm* — Birch, Stewart, Kolasch & Birch, LLP

(57) ABSTRACT

A method and user equipment (UE) are provided for concurrently accessing a plurality of cells. The UE sets a connection with any one cell corresponding to a primary cell among frequency division duplex (FDD)-based cells and time division duplex (TDD)-based cells, and receives, from the any one cell, first cell indexes for the FDD-based cells and second cell indexes for the TDD-based cells. The UE further sets a connection with a secondary cell indicated by any one index among the first cell indexes and the second cell indexes. At least one value among the first cell indexes overlaps with at least one of the second cell indexes.

12 Claims, 16 Drawing Sheets

(51) Int. Cl.
    *H04B 7/26*     (2006.01)
    *H04L 5/00*     (2006.01)
    *H04L 5/14*     (2006.01)
    *H04W 52/34*     (2009.01)
    *H04W 72/04*     (2009.01)
    *H04W 52/28*     (2009.01)
    *H04W 52/36*     (2009.01)
    *H04W 48/20*     (2009.01)
    *H04W 74/00*     (2009.01)
    *H04W 84/04*     (2009.01)

(52) U.S. Cl.
    CPC .............. *H04L 5/0092* (2013.01); *H04L 5/14* (2013.01); *H04W 52/281* (2013.01); *H04W 52/34* (2013.01); *H04W 52/346* (2013.01); *H04W 52/367* (2013.01); *H04W 72/0413* (2013.01); *H04W 76/026* (2013.01); *H04W 48/20* (2013.01); *H04W 74/00* (2013.01); *H04W 84/045* (2013.01)

(56) References Cited

U.S. PATENT DOCUMENTS

| | | | |
|---|---|---|---|
| 2012/0281600 A1 | 11/2012 | Tseng et al. | |
| 2012/0307919 A1 | 12/2012 | Ranta | |
| 2013/0208691 A1* | 8/2013 | Yang | H04L 1/0029 370/329 |
| 2013/0242923 A1* | 9/2013 | Yang | H04L 1/1825 370/329 |
| 2014/0016596 A1* | 1/2014 | Kim | H04L 5/001 370/329 |
| 2014/0169343 A1* | 6/2014 | Skov | H04L 5/0007 370/336 |
| 2015/0131579 A1* | 5/2015 | Li | H04L 1/08 370/329 |
| 2016/0021655 A1 | 1/2016 | Seo et al. | |
| 2016/0072612 A1* | 3/2016 | Seo | H04L 1/1835 370/329 |

* cited by examiner (b) MULTIPLE CCS (a) SINGLE CC

METHOD FOR CONCURRENTLY ACCESSING PLURALITY OF CELLS AND USER EQUIPMENT

CROSS REFERENCE TO RELATED APPLICATIONS

This application is the National Phase of PCT International Application No. PCT/KR2014/007432, filed on Aug. 11, 2014, which claims priority under 35 U.S.C. 119(e) to U.S. Provisional Application No. 61/878,616, filed on Sep. 17, 2013, all of which are hereby expressly incorporated by reference into the present application.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, recently, a user demands a higher transfer rate, and to cope with this demand, there is a need to allow a user equipment (UE) to be capable of concurrently accessing both of a cell using FDD and a cell using TDD. If a certain mobile communication operator provides only an FDD-based service or a TDD-based service similarly to the conventional method at a time at which the higher transfer rate is required, it may be ineffective in terms of a frequency usage.

SUMMARY OF THE INVENTION

Accordingly, a disclosure of the present specification has been made in an effort to solve the aforementioned problem.

In order to achieve the aforementioned purpose, one embodiment of the present specification provides a method for concurrently accessing a plurality of cells. The method may be performed by a user equipment (UE) and comprise: setting a connection with any one cell corresponding to a primary cell among frequency division duplex (FDD)-based cells and time division duplex (TDD)-based cells; receiving, from the any one cell, first cell indexes for the FDD-based cells and second cell indexes for the TDD-based cells; and setting a connection with a secondary cell indicated by any one index among the first cell indexes and the second cell indexes. Here, at least one value among the first cell indexes possibly overlaps with at least one of the second cell indexes.

A value of a cell index for the primary cell may be zero (0), which does not overlap with the first cell indexes and the second cell indexes.

The method may further comprise: if simultaneous transmission of a physical uplink control channel (PUCCH) and a physical uplink shared channel (PUSCH) is configured, determining whether there are one or more connected FDD-based cells; and if there are one or more connected FDD-based cells, performing transmission by including the entirety or part of uplink control information (UCI) on a PUSCH of an FDD-based cell having a lowest cell index among the first cell indexes.

The method may further comprise: if a sounding reference signal (SRS) is transmitted to the FDD-based cell and the TDD-based cell, distributing determined maximum transmission power to the FDD-based cell and the TDD-based cell; scaling transmission power distributed for the FDD-based cell; and scaling transmission power distributed for the TDD-based cell.

The method may further comprise: if an SRS is transmitted to the FDD-based cell and the TDD-based cell, allocating determined maximum transmission power preferentially to the TDD-based cell; and allocating remaining transmission power to the FDD-based cell after the previous allocation.

The method may further comprise: if a channel state information (CSI) report to be transmitted to the FDD-based cell and a CSI report to be transmitted to the TDD-based cell collide on one subframe, dropping the CSI report to be transmitted to the TDD-based cell, and transmitting the CSI report to the FDD-based cell.

In order to achieve the aforementioned purpose, one embodiment of the present specification provides a user equipment (UE) capable of concurrently accessing a plurality of cells. The UE may comprise a wireless transceiver and a processor. The processor is configured to control the wireless transceiver to set a connection with any one cell corresponding to a primary cell among frequency division duplex (FDD)-based cells and time division duplex (TDD)-based cells, receive, from the any one cell, first cell indexes for the FDD-based cells and second cell indexes for the TDD-based cells, and configure a connection with a secondary cell indicated by any one index among the first cell indexes and the second cell indexes. At least one value among the first cell indexes possibly overlaps with at least one of the second cell indexes.

According to a disclosure of the present specification, the aforementioned problem of the conventional technique can be solved.

DESCRIPTION OF EXEMPLARY EMBODIMENTS

Figure 1:
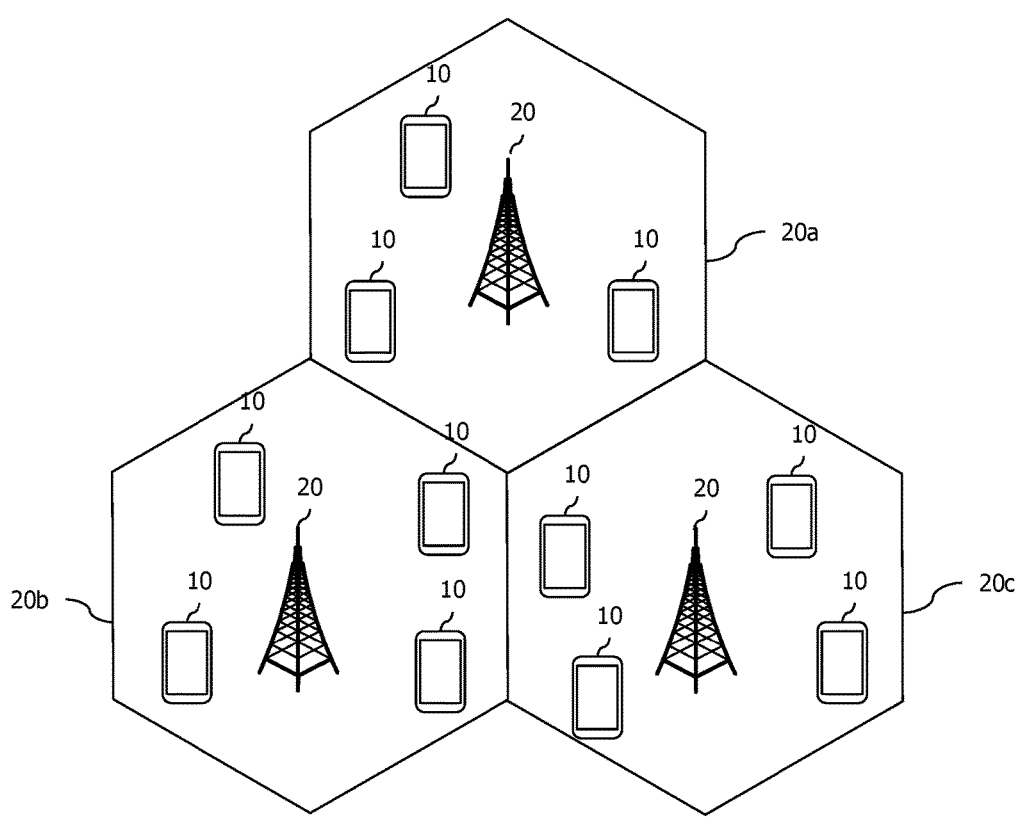
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
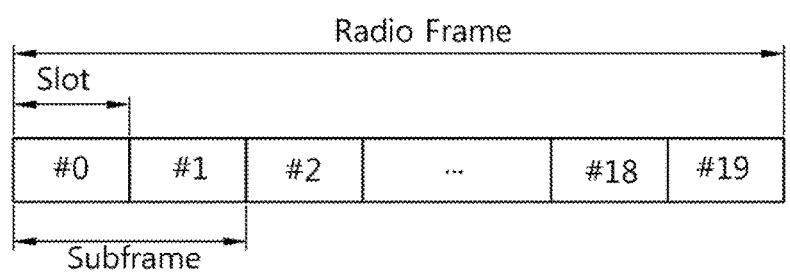
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
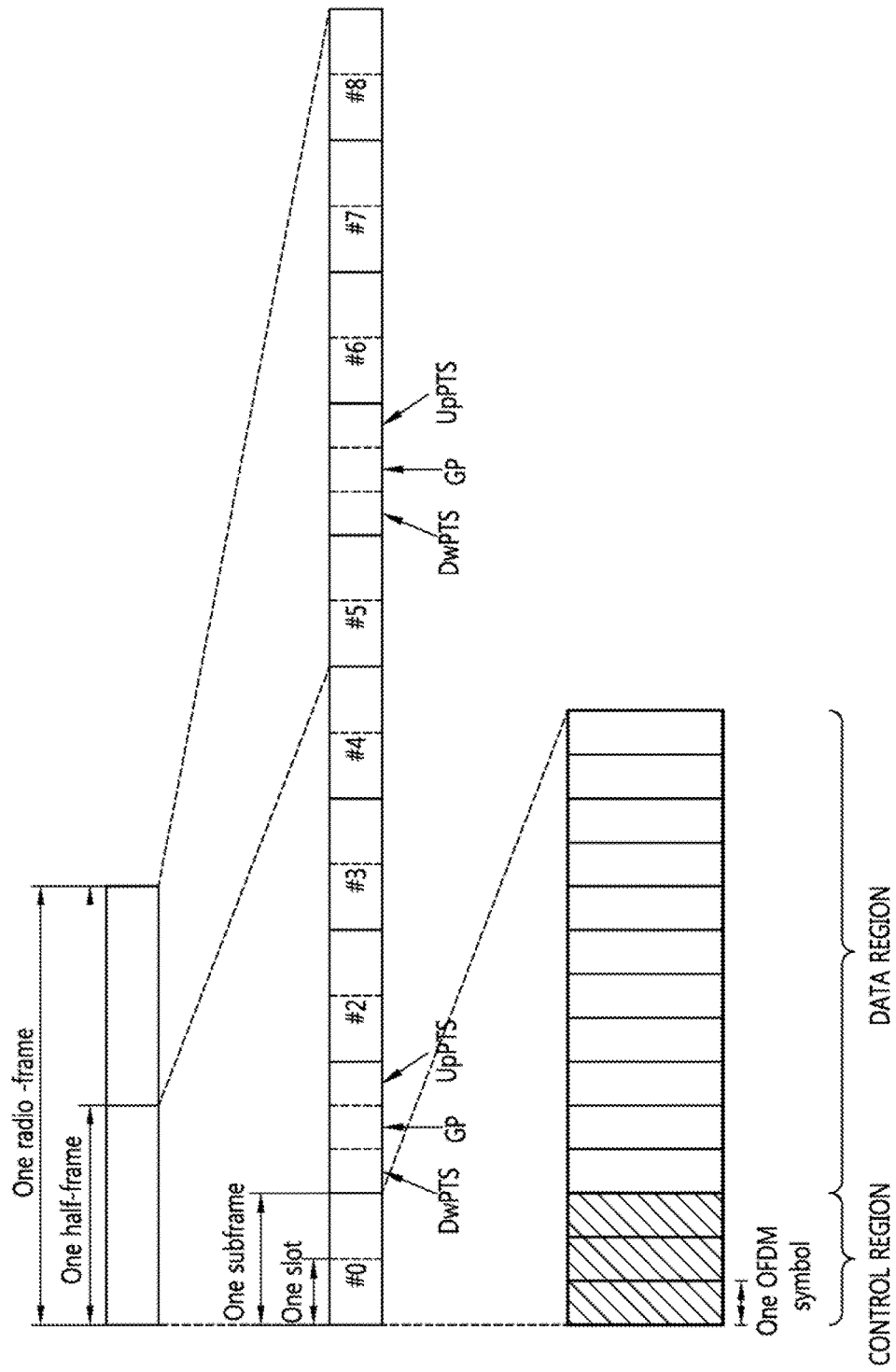
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Config- uraiton | Switch- point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
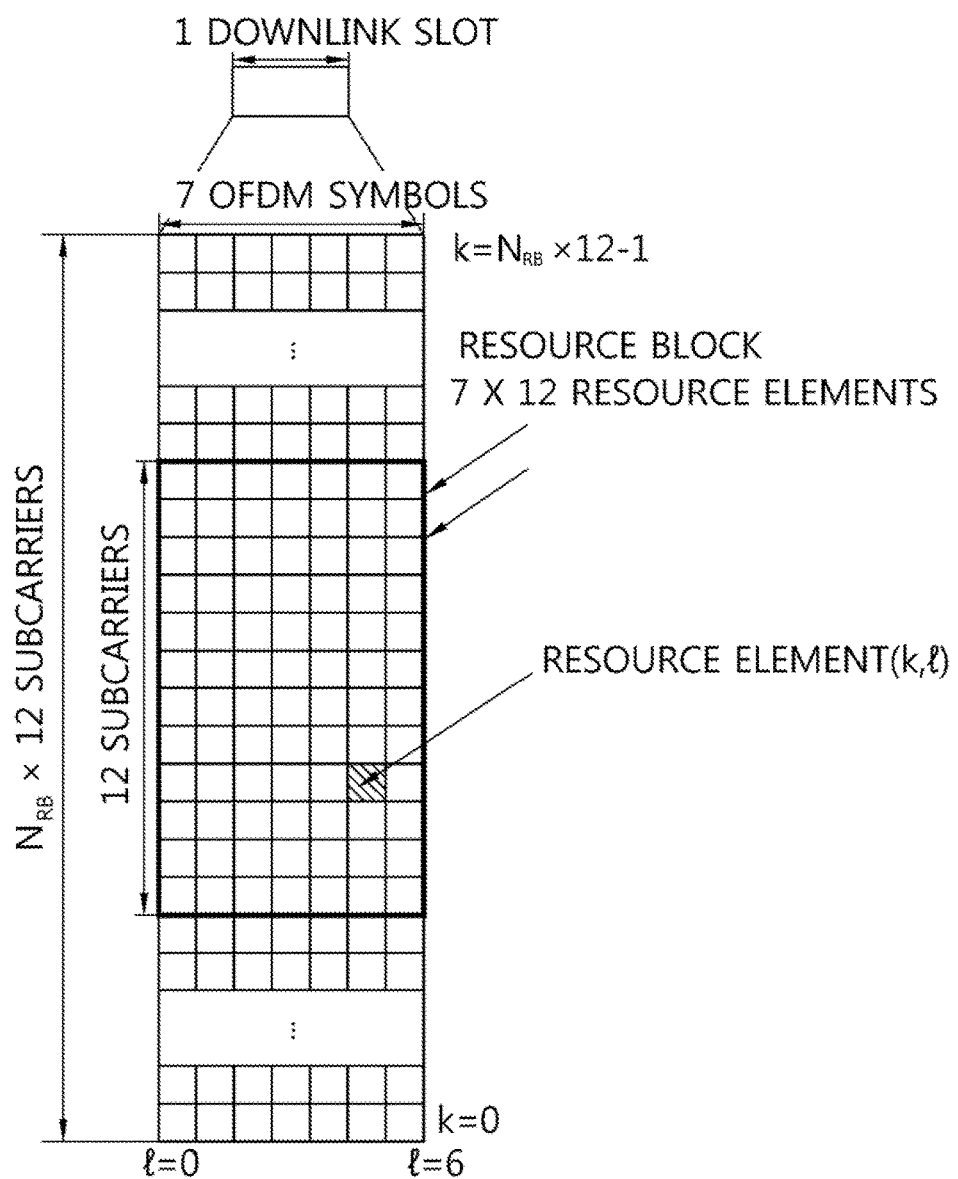
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
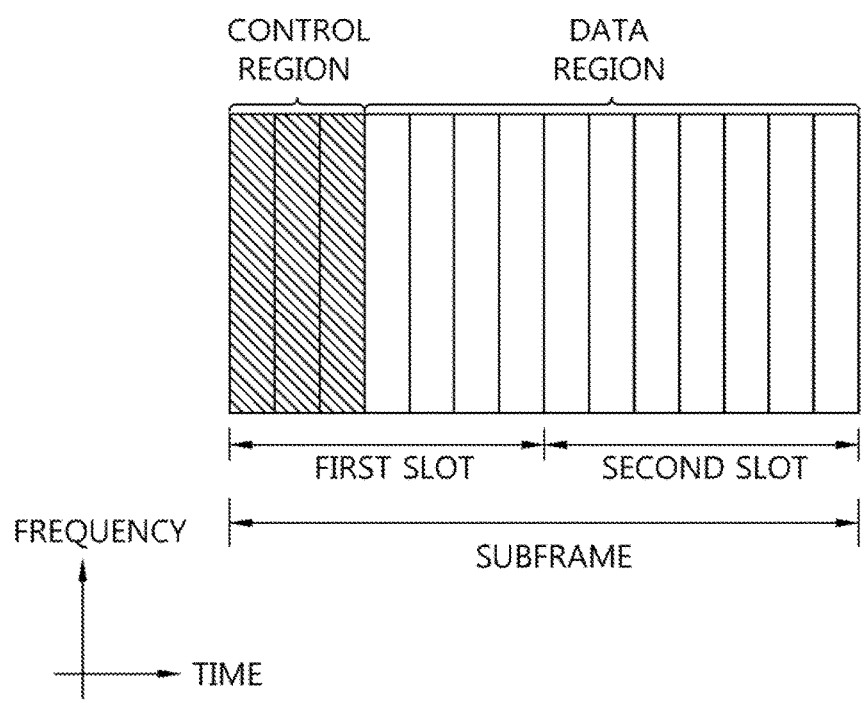
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

A usage of the DCI format is classified as shown in the following table.

TABLE 3

| DCI format | Contents |
| --- | --- |
| DCI format 0 | Used for PUSCH scheduling |
| DCI format 1 | Used for scheduling one PDSCH codeword |
| DCI format 1A | Used for compact scheduling of one PDSCH codeword and random access procedure |
| DCI format 1B | Used for compact scheduling of one PDSCH codeword including precoding information |
| DCI format 1C | Used for very compact scheduling of one PDSCH codeword |
| DCI format 1D | Used for precoding and compact scheduling of one PDSCH codeword including power offset information |
| DCI format 2 | Used for PDSCH scheduling UEs setup as closed-loop spatial multiplexing |
| DCI format 2A | Used for PDSCH scheduling UEs setup as open-loop spatial multiplexing |
| DCI format 3 | Used for transmitting PUCCH having 2 bit power adjustments and TPC command of PUSCH |
| DCI format 3A | Used for transmitting PUCCH having 1 bit power adjustments and TPC command of PUSCH |

The uplink channels include a PUSCH, a PUCCH, an SRS (Sounding Reference Signal), and a PRACH (physical random access channel).

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease

TABLE 2

| Transmission mode | DCI format | Search space | Transmission mode of PDSCH according to PDCCH |
| --- | --- | --- | --- |
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |
| Mode 3 | DCI format 1A | Common and UE-specific | Transmission diversity |
|  | DCI format 2A | UE-specific | CDD (Cyclic Delay Diversity) or Transmission diversity |
| Mode 4 | DCI format 1A | Common and UE-specific | Transmission diversity |
|  | DCI format 2 | UE-specific | Closed-loop spatial multiplexing |
| Mode 5 | DCI format 1A | Common and UE-specific | Transmission diversity |
|  | DCI format 1D | UE-specific | MU-MIMO(Multi-user Multiple Input Multiple Output) |
| Mode 6 | DCI format 1A | Common and UE-specific | Transmission diversity |
|  | DCI format 1B | UE-specific | Closed-loop spatial multiplexing |
| Mode 7 | DCI format 1A | Common and UE-specific | Single antenna port, port 0 if the number of PBCH transmission port is 1, otherwise Transmission diversity |
|  | DCI format 1 | UE-specific | Single antenna port, port 5 |
| Mode 8 | DCI format 1A | Common and UE-specific | Single antenna port, port 0 if the number of PBCH transmission port is 1, otherwise Transmission diversity |
|  | DCI format 2B | UE-specific | Dual layer transmission (port 7 or 8), or single antenna port, port 7 or 8 | an overhead caused by CRS transmission, an enhanced PDCCH (EPDCCH) is introduced.

Figure 6:
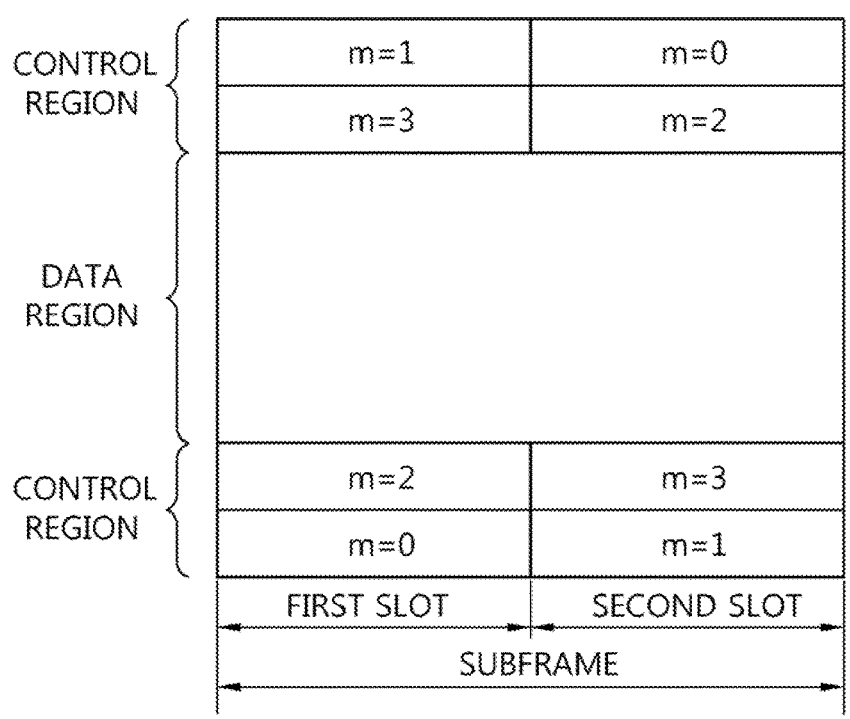
FIG. 6 illustrates the architecture of an uplink subframe in 3GPP LTE.
Figure 6:
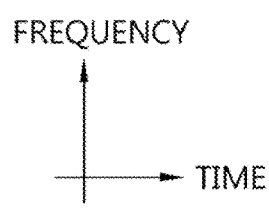

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

Figure 7:
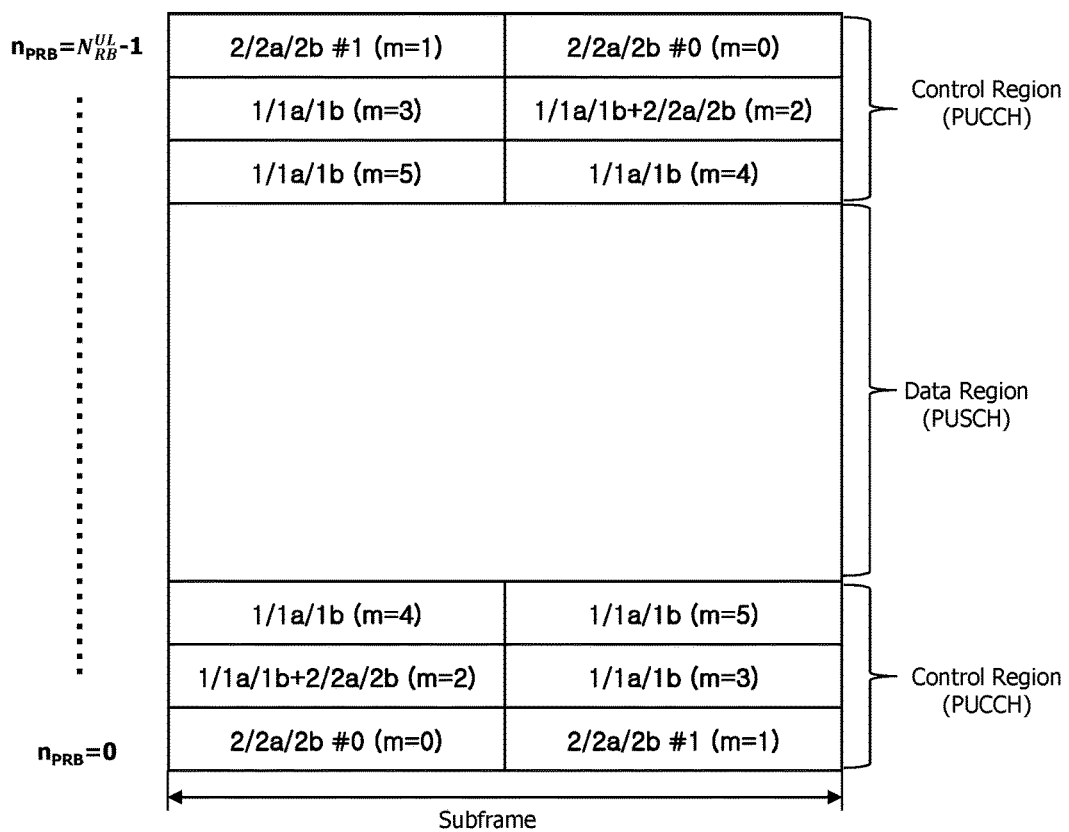
FIG. 7 illustrates a PUCCH and a PUSCH on an uplink subframe.

FIG. 7 illustrates a PUCCH and a PUSCH on an uplink subframe.

PUCCH formats will be described with reference to FIG. 7.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) scheme may be applied. PUCCH format 1a transmits an acknowledgement/non-acknowledgment (ACK/NACK) modulated by a binary phase shift keying (BPSK) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 4 illustrates the PUCCH formats.

TABLE 4

| Format | Description |
| --- | --- |
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats.

A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel. Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

A carrier aggregation system is now described.

Figure 8:
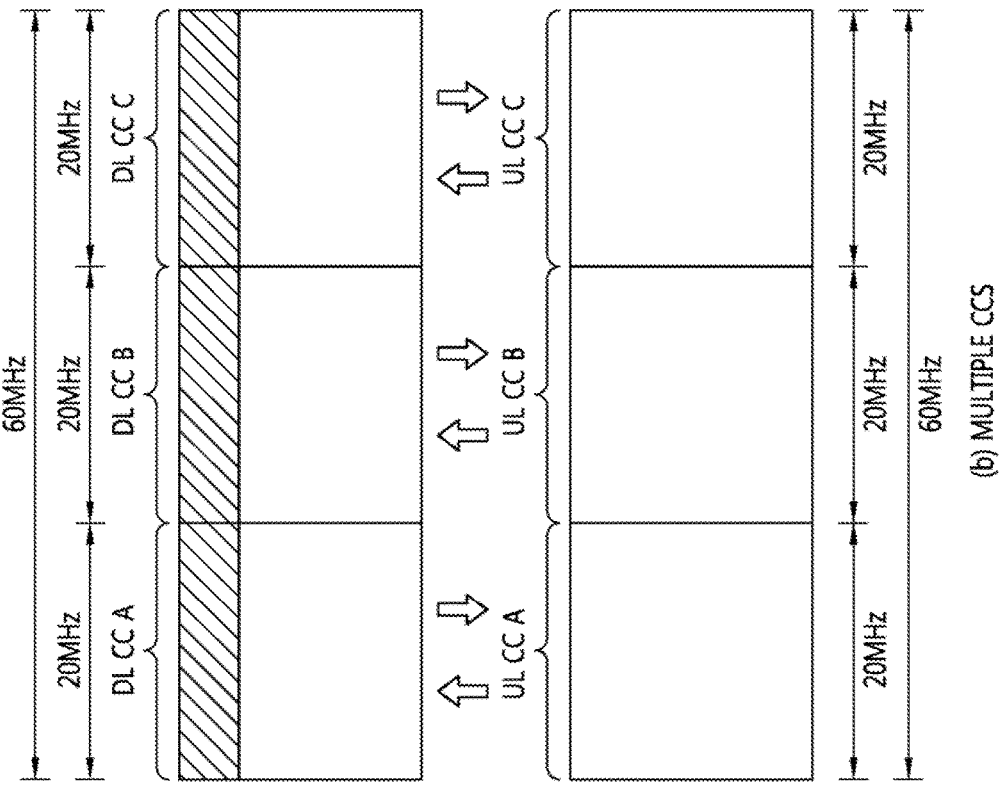
FIG. 8 illustrates an example of comparison between a single carrier system and a carrier aggregation system.
Figure 8:
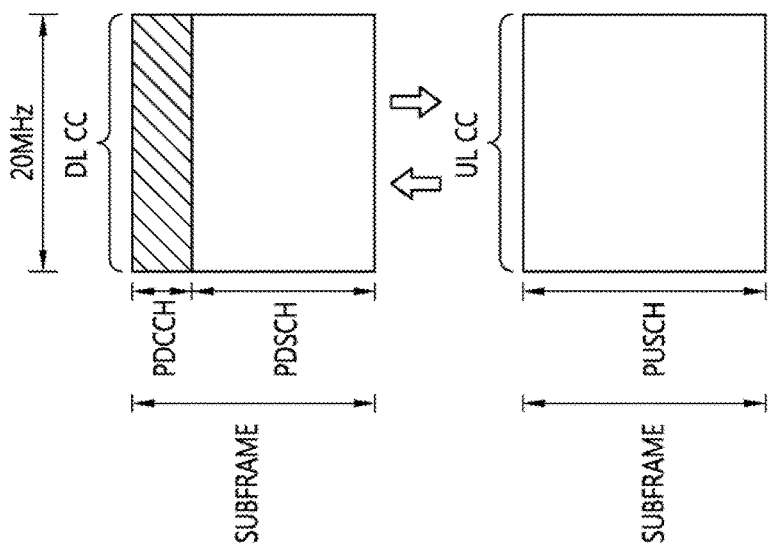

FIG. 8 illustrates an example of comparison between a single carrier system and a carrier aggregation system.

Referring to FIG. 8, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 9:
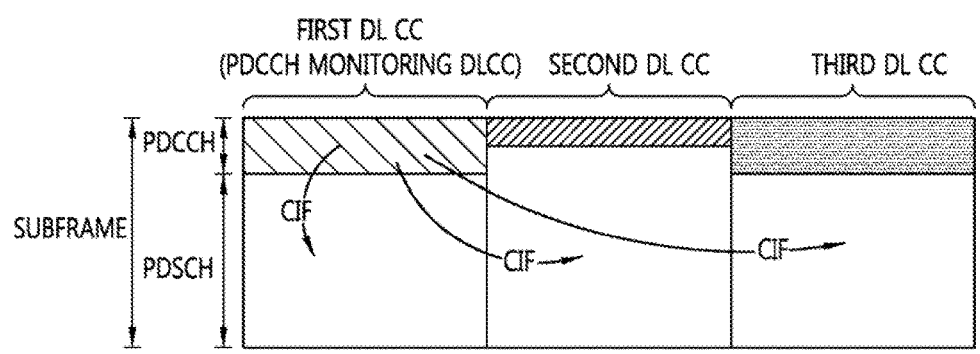
FIG. 9 exemplifies cross-carrier scheduling in a carrier aggregation system.

FIG. 9 exemplifies cross-carrier scheduling in the carrier aggregation system.

Referring to FIG. 9, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 9 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

<Transmission of Channel State Information (CSI)>

Hereinafter, periodic transmission and aperiodic transmission of the CSI will be described.

Figure 10A:
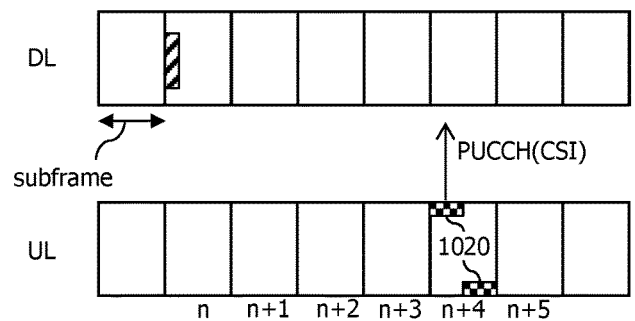
FIG. 10a illustrates an example of a periodic CSI report in 3GPP LTE.

FIG. 10a illustrates an example of a periodic CSI report in 3GPP LTE.

As shown in FIG. 10a, the CSI may be transmitted through the PUCCH periodically according to a period determined in the upper layer. That is, the periodic channel status information (CSI) may be transmitted through the PUCCH.

The UE may be semi-statically configured by an upper layer signal so as to periodically feed-back a differential CSI (CQI, PMI, RI) through the PUCCH. In this case, the UE transmits the corresponding CSI according to modes defined as shown in a table given below.

TABLE 5

|  |  | PMI feed-back time | |
| --- | --- | --- | --- |
|  |  | No PMI | Single PMI |
| PUCCH CQI feedback type | Wideband CQI | Mode 1-0 | Mode 2-0 |
|  | Selective subband CQI | Mode 2-0 | Mode 2-1 |

A periodic CSI reporting mode in the PUCCH described below is supported for each of the aforementioned transmission modes.

TABLE 6

| Transmission mode | PUCCH CSI reporting mode |
| --- | --- |
| Transmission mode 1 | Modes 1-0, 2-0 |
| Transmission mode 2 | Modes 1-0, 2-0 |
| Transmission mode 3 | Modes 1-0, 2-0 |

TABLE 6-continued

| Transmission mode | PUCCH CSI reporting mode |
| --- | --- |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | When PMI/RI reporting is configured to UE in modes 1-1 and 2-1; When PMI/RI reporting is not configured to UE in modes 1-0 and 2-0 |
| transmission mode 9 | When PMI/RI reporting is configured to UE in modes 1-1 and 2-1 and the number of CSI-RS ports is larger than 1. When PMI/RI reporting is not configured to UE in modes 1-0 and 2-0 or the number of CSI-RS ports is 1 |

Meanwhile, a collision of the CSI report means a case in which a subframe configured to transmit a first CSI and a subframe configured to transmit a second CSI are the same as each other. When the collision of the CSI report occurs, the first CSI and the second CSI are simultaneously transmitted, or the transmission of a CSI having a low priority is discarded (alternatively, referred to as abandon or drop), and a CSI having a high priority may be transmitted, according to priorities of the first CSI and the second CSI.

The CSI report through the PUCCH may include various report types according to a transmission combination of the CQI, the PMI, and the RI, and a period and an offset value divided according to each report type (hereinafter, abbreviated as a type) are supported.

Type 1: Supports CQI feedback for a subband selected by the UE.

Type 1a: Supports subband CQI and second PMI feedback.

Types 2, 2b, and 2c: Supports wideband CQI and PMI feedback.

Type 2a: Supports wideband PMI feedback.

Type 3: Supports RI feedback.

Type 4: Transmits the wideband CQI.

Type 5: Supports RI and wideband PMI feedback.

Type 6: Supports RI and PTI feedback.

Hereinafter, the aperiodic transmission of CSI is described.

Figure 10B:
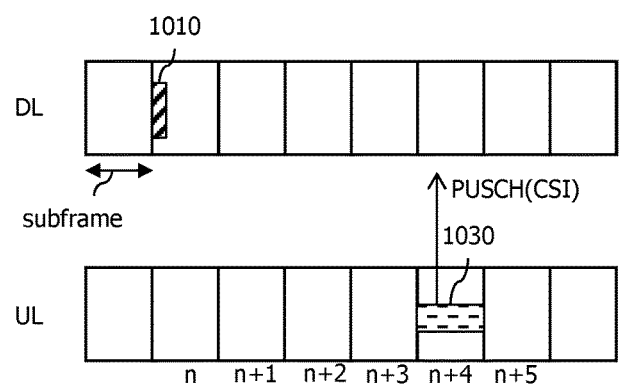
FIG. 10b illustrates an example of an aperiodic CSI report in 3GPP LTE.

FIG. 10b illustrates an example of an aperiodic CSI report in 3GPP LTE.

A control signal that requests the transmission of CSI, that is, an aperiodic CSI request signal, may be included in the scheduling control signal of a PUSCH transmitted in a PDCCH 1010, that is, an UL grant. In this case, UE aperiodically reports CSI through a PUSCH 1020. As described above, the transmission of CSI on a PUSCH is called an aperiodic CSI report in that it is triggered in response to a request from a BS. The CSI report may be triggered by an UL grant or a random access response grant.

More specifically, a wireless device receives an UL grant, including information about the scheduling of the PUSCH, through the PDCCH 1010 in a subframe n. The UL grant may include a CQI request field. The following table illustrates an example of a CQI request field of 2 bits. The value or number of bits of the CQI request field is only an example.

TABLE 7

| Value of CQI request field | Contents |
| --- | --- |
| 00 | A CSI report is not triggered |
| 01 | A CSI report on a serving cell is triggered |
| 10 | A CSI report on a first set of serving cells is triggered |
| 11 | A CSI report on a second set of serving cells is triggered |

A BS may previously notify a wireless device of information about the first and the second sets whose CSI reports are triggered.

A BS may previously notify a wireless device of information about the first and the second sets whose CSI reports are triggered.

When a CSI report is triggered, the wireless device sends CSI on the PUSCH 1020 in a subframe n+k. In this case, k=4, but is only an example.

A BS may previously designate report mode for CSI to a wireless device.

The following table illustrates an example of CSI report modes in 3GPP LTE.

TABLE 8

| | PMI feedback type | | |
| --- | --- | --- | --- |
| | No PMI | Single PMI | Multiple PMI |
| Wideband CQI | | | Mode 1-2 |
| Selective subband CQI | Mode 2-0 | | Mode 2-2 |
| Set subband CQI | Mode 3-0 | Mode 3-1 | |

(1) Mode 1-2 (Mode 1-2)

A precoding matrix is selected on the assumption that DL data is transmitted only through a corresponding subband with respect to each subband. A wireless device generates a CQI (called a wideband CQI) by assuming the selected precoding matrix with respect to a band (called a band set S) designated by a system band or a high layer signal.

The wireless device sends CSI including the wideband CQI and the PMI of each subband. In this case, the size of each subband may be different depending on the size of a system band.

(2) Mode 2-0

A wireless device selects preferred M subbands with respect to a band (band set S) designated by a system band or a high layer signal. The wireless device generates a subband CQI by assuming that data has been transmitted in the selected M subbands. The wireless device additionally generates a single wideband CQI with respect to the system band or the band set S.

The wireless device sends CSI, including information about the selected M subbands, the subband CQI, and the wideband CQI.

(3) Mode 2-2

A wireless device selects M preferred subbands and a single precoding matrix for the M preferred subbands on the assumption that DL data is transmitted through the M preferred subbands.

Subband CSI for the M preferred subbands is defined in each codeword. In addition, the wireless device generates a wideband CQI for a system band or a band set S.

The wireless device sends CSI, including the M preferred subbands, a single subband CQI, and a PMI, wideband PMI, and wideband CQI for the M preferred subbands.

(4) Mode 3-0

A wireless device sends CSI, including a wideband CQI and a subband CQI for configured subbands.

(5) Mode 3-1

A wireless device generates a single precoding matrix for a system band or a band set S. The wireless device generates a subband CQI for each codeword by assuming the generated single precoding matrix. The wireless device may generate a wideband CQI by assuming the single precoding matrix.

The simultaneous transmission of a PUCCH and a PUSCH is described below.

In 3GPP Release 8 or Release 9 systems, UE is not allowed to simultaneously send a PUCCH and a PUSCH on a single carrier in order to maintain single carrier characteristics when using the SC-FDMA method for uplink transmission.

In 3GPP Release 10 systems, however, whether a PUCCH and a PUSCH are simultaneously transmitted may be indicated by a higher layer. That is, UE may simultaneously send a PUCCH and a PUSCH or may send only one of a PUCCH and a PUSCH in response to an instruction from a higher layer.

Figure 10C:
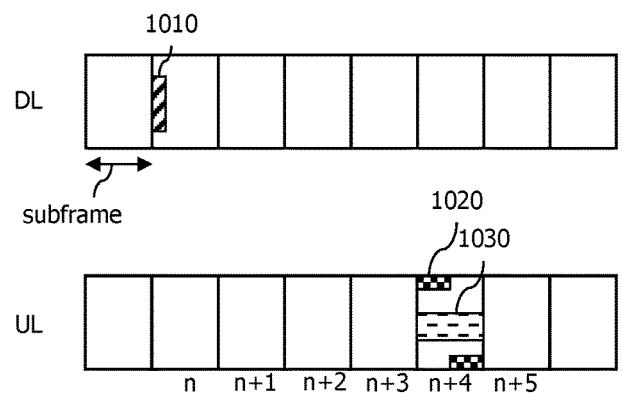
FIG. 10c illustrates an example of the simultaneous transmission of a PUCCH and a PUSCH.

FIG. 10c illustrates an example of the simultaneous transmission of a PUCCH and a PUSCH.

As may be seen with reference to FIG. 10c, UE receives a PDCCH 1010 in a subframe n.

Furthermore, the UE may simultaneously send a PUCCH 1020 and a PUSCH 1030 in a subframe n+4, for example.

The simultaneous transmission of the PUCCH and the PUSCH is defined as follows in a 3GPP Release 10 system.

It is assumed that UE has been configured for only a single serving cell and configured to not simultaneously send a PUSCH and a PUCCH. In this case, if the UE does not send a PUSCH, UCI may be transmitted according to the PUCCH formats 1/1a/1b/3. If the UE sends a PUSCH, but the PUSCH does not correspond to a random access response grant, UCI may be transmitted through the PUSCH.

Unlike in the above, it is assumed that UE has been configured for only a single serving cell and configured to not simultaneously send a PUSCH and a PUCCH. In this case, if UCI includes only HARQ-ACK and an SR, UCI may be transmitted through a PUCCH according to the PUCCH formats 1/1a/1b/3. If UCI includes only periodic CSI, however, the UCI may be transmitted on a PUCCH according to the PUCCH format 2. Alternatively, if UCI includes periodic CSI and HARQ-ACK and the UE does not send a PUSCH, the UCI may be transmitted through a PUCCH according to the PUCCH formats 2/2a/2b. Alternatively, if UCI includes only HARQ-ACK/NACK or UCI includes HARQ-ACK/NACK and an SR, UCI includes an affirmative SR and periodic/aperiodic CSI, or UCI includes only aperiodic CSI, the HARQ-ACK/NACK, the SR, and the affirmative SR may be transmitted through a PUCCH, and the periodic/aperiodic CSI may be transmitted through a PUSCH.

Unlike in the above, it is assumed that UE has been configured for one or more serving cells and configured to not simultaneously send a PUSCH and a PUCCH. In this case, if the UE does not send a PUSCH, UCI may be transmitted through a PUCCH according to the PUCCH formats 1/1a/1b/3. If UCI includes aperiodic CSI or includes aperiodic UCI and HARQ-ACK, the UCI may be transmitted through the PUSCH of a serving cell. Alternatively, if UCI includes periodic CSI and HARQ-ACK/NACK and the UE does not send a PUSCH in the subframe n of a primary cell, the UCI may be transmitted through the PUSCH.

Unlike in the above, it is assumed that UE has been configured for one or more serving cells and configured to be able to simultaneously send a PUSCH and a PUCCH. In this case, if UCI includes one or more of HARQ-ACK and an SR, the UCI may be transmitted through a PUCCH according to the PUCCH formats 1/1a/1b/3. If UCI includes only periodic CSI, however, the UCI may be transmitted through a PUCCH using the PUCCH format 2. Alternatively, if UCI includes periodic CSI and HARQ-ACK/NACK and the UE does not send a PUSCH, CSI may be dropped (or abandoned) without being transmitted according to some conditions. Alternatively, if UCI is transmitted through HARQ-ACK/NACK and periodic CSI and the UE sends a PUSCH in the subframe of a primary cell, the HARQ-ACK/NACK may be transmitted through a PUCCH according to the PUCCH formats 1a/1b/3 and the periodic CSI may be transmitted through the PUSCH.

<Introduction of Small Cell>

Meanwhile, in a next-generation mobile communication system, it is expected that a small cell of which a cell coverage radius is small is added in the coverage of a legacy cell and that the small cell handles a greater amount of traffic. The legacy cell has a greater coverage than that of the small cell, and thus is also referred to as a macro cell. Hereinafter, it is described with reference to FIG. 11.

Figure 11:
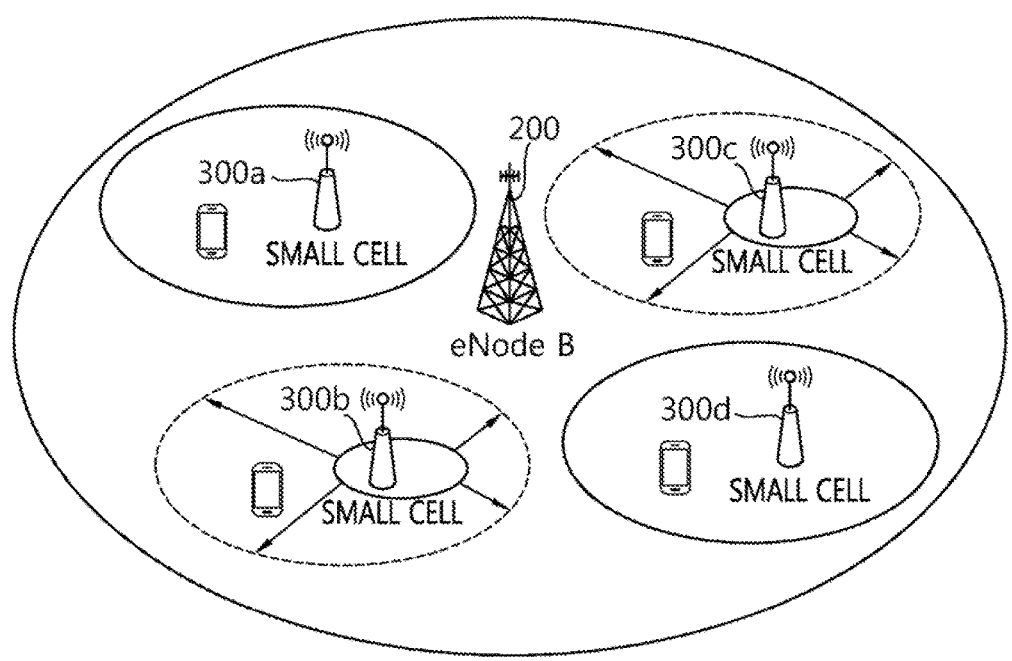
FIG. 11 shows a heterogeneous network environment in which a macro cell and a small cell co-exist and which is possibly used in a next-generation wireless communication system.

FIG. 11 shows a heterogeneous network environment in which a macro cell and a small cell co-exist and which is possibly used in a next-generation wireless communication system.

Referring to FIG. 11, it is shown a heterogeneous network environment in which a macro cell 200 overlaps with one or more small cells 300a, 300b, 300c, and 300d. A service of the macro cell 200 is provided by a macro eNodeB (MeNB). In the present specification, the macro cell and the MeNB may be used together. A UE having access to the macro cell 200 may be referred to as a macro UE. The macro UE receives a downlink signal from the MeNB, and transmits an uplink signal to the MeNB.

In such a heterogeneous network, coverage holes of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

Meanwhile, the small cell may use a frequency band currently assigned to LTE/LTE-A, or may use a higher frequency band (e.g., a band greater than or equal to 3.5 GHz).

On the other hand, in a next LTE-A system, it is considered that the small cell is used only as a macro-assisted small cell which cannot be used independently and can be used under an assistance of the macro cell.

The small cells 300a, 300b, 300c, and 300d may have similar channel environments, and are located close to each other. Therefore, interference between the small cells is not a big problem.

The small cells 300b and 300c may extend or reduce their coverage to decrease an interference influence. Such coverage extension and reduction are called cell breathing. For example, as illustrated, the small cells 300b and 300c may be on or off according to a situation.

On the other hand, the small cell may use a frequency band currently assigned to LTE/LTE-A, or may use a higher frequency band (e.g., a band greater than or equal to 3.5 GHz).

Meanwhile, the UE may perform dual connectivity to the macro cell and the small cell. Possible dual connectivity scenarios are shown in FIG. 11a to FIG. 11d.

Figure 12A:
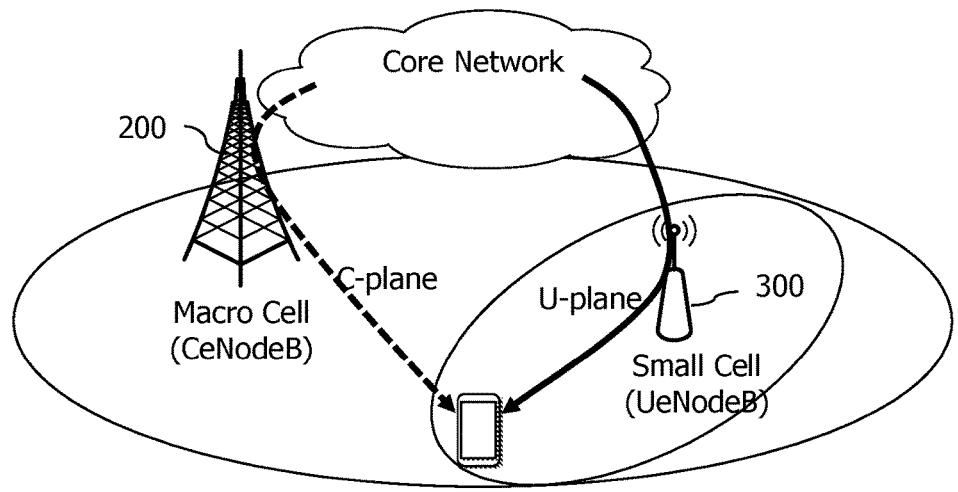
FIG. 12a and FIG. 12b show possible dual connectivity scenarios for a macro cell and a small cell.
Figure 12B:
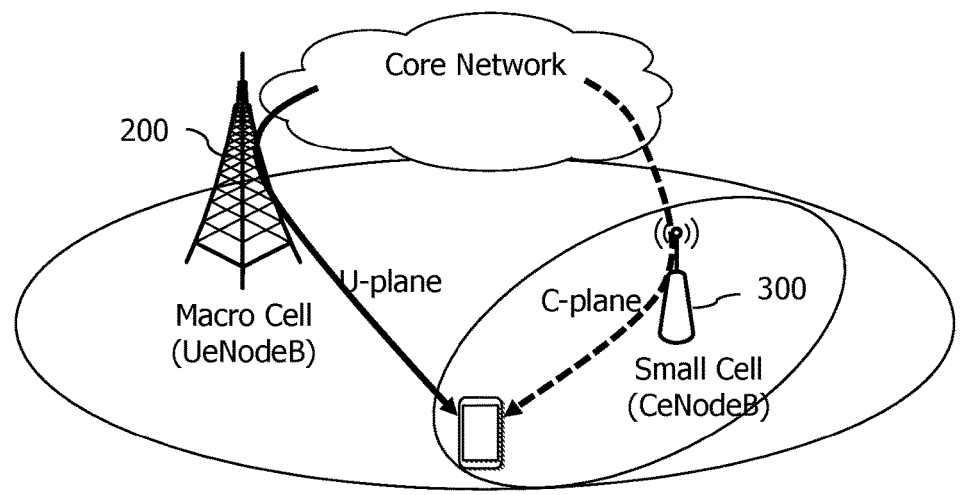

FIG. 12a and FIG. 12b show possible dual connectivity scenarios for a macro cell and a small cell.

As shown in FIG. 12a, a macro cell and a small cell may be assigned to a UE as a Control-plane (hereinafter, C-plane) and a User-plane (hereafter, U-plane), respectively.

Alternatively, as shown in FIG. 12b, a small cell and a macro cell may be assigned to a UE as a C-plane and a U-plane, respectively. In the present specification, for convenience, a cell of the C-plane and a cell of the U-plane are referred to as a C-cell and a U-cell, respectively.

The C-plane supports an RRC connection configuration and reconfiguration, an RRC idle mode, a mobility including handover, a cell selection/reselection, an HARQ process, a carrier aggregation (CA) configuration and reconfiguration, a necessary procedure for RRC configuration, a random access procedure, or the like. In addition, the U-plane supports data processing of an application, a CSI report, an HARQ process for application data, a multicasting/broadcasting service, or the like.

From a UE perspective, the C-plane and the U-plane are configured as follows. The C-cell may be configured as a primary cell, and the U-cell may be configured as a secondary cell. Alternatively, on the contrary, the U-cell may be configured as the primary cell, and the C-cell may be configured as the secondary cell. Alternatively, the C-cell may be separately handled in a special manner, and the U-cell may be configured as the primary cell. Alternatively, both of the C-plane and the U-cell may be configured as the primary cells. However, in the present specification, for convenience, it is assumed in the following description that the C-cell is configured as the primary cell and the U-cell is configured as the secondary cell.

Meanwhile, as described above, in case of a UE 100, one UE may have access to a plurality of cells. However, according to the existing LTE-A release 10, the plurality of cells must have the same frame structure type. In other words, according to the existing LTE-A release 10, all of the plurality of cells must use either FDD or TDD.

In recent years, a user demands a higher transfer rate, and to cope with this demand, there is a need to allow a UE to be capable of concurrently accessing both of a cell using FDD and a cell using TDD. If a certain mobile communication operator provides only an FDD-based service or a TDD-based service similarly to the conventional method at a time at which the higher transfer rate is required, it may be ineffective in terms of a frequency usage.

<Brief Description on Disclosures of the Present Specification>

Accordingly, disclosures of the present specification propose a method for allowing a UE to be capable of performing transmission/reception by concurrently accessing both of a cell using FDD and a cell using TDD.

Figure 13:
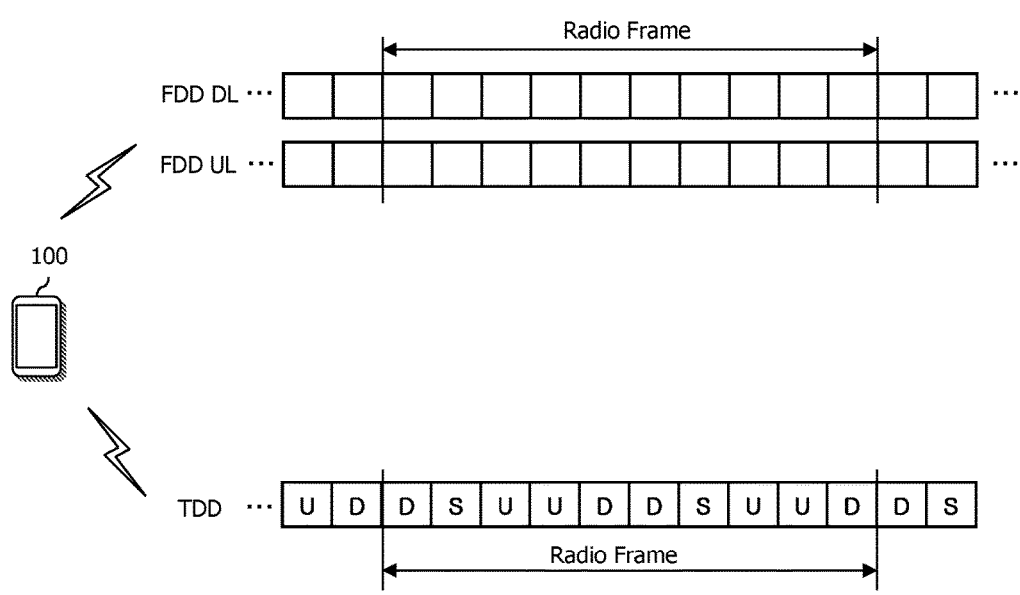
FIG. 13 illustrates an example in which a user equipment (UE) concurrently accesses an FDD-based cell and a TDD-based cell according to a first disclosure of the present specification.

FIG. 13 illustrates an example in which a UE concurrently accesses an FDD-based cell and a TDD-based cell according to a first disclosure of the present specification.

As may be seen with reference to FIG. 13, a UE 100 is capable of concurrently accessing the FDD-based cell and the TDD-based cell. As such, the UE 100 may be allowed to be capable of accessing the plurality of cells through a carrier aggregation (CA) and a dual connectivity.

Meanwhile, in the legacy system, a cell index is used to distinguish a primary cell and a secondary cell in the CA. In general, a cell index of a primary cell of the UE is assigned with 0, and a cell index of a secondary cell of the UE is assigned with one of 1 to 7. Detailed examples of using the cell index are described below. The cell index may be used to identify a corresponding cell when activating a cell. The cell index may be used to select a PUSCH of any one cell from among PUSCHs of a plurality of cells when the entirety or part of UCI is piggybacked on the PUSCH. The cell index may be used to indicate transmission power for an uplink channel or transmission power of the UE for each cell. The cell index may be used when a reporting type is determined in a situation of a CSI collision and when a priority is determined in a situation of the same CSI process ID. The cell index may be used to identify a corresponding cell when selecting aperiodic CSI. The cell index may be used when HARQ-ACK bits are generated for a plurality of cells. The cell index may be used when generating the aperiodic CSI for the plurality of cells. The cell index may be used to identify a cell for scheduling a resource of a corresponding cell when cross-carrier scheduling is achieved.

However, as described above, when the UE is allowed to be capable of concurrently accessing both of the FDD-based cell and the TDD-based cell to perform transmission/reception according to the disclosure of the present specification, the conventional method of allocating a cell index may be ineffective. Herein, the cell index may be any one of cellIndex, ServCellIndex, and sCellIndex used in the 3GPP standard. For example, conventionally, the cell index is simply considered when selecting any one cell for piggybacking UCI from among the plurality of cells. However, when the UE performs a carrier aggregation (CA) or a dual connectivity on the FDD-based cell and the TDD-based cell, if only a cell index is simply considered, it may be inevitably ineffective since it is impossible to exclude a possibility of selecting the TDD-based cell having a smaller uplink transmission opportunity, rather than the FDD-based cell having a greater uplink transmission opportunity.

On the other hand, in general, the UE transmits a sounding reference signal (SRS) so that a serving cell is allowed to estimate an uplink channel. However, only the uplink channel may be estimated through the SRS since the FDD-based cell separately operates an uplink carrier and a downlink carrier, whereas the uplink channel and the downlink channel may be both estimated through the SRS since the TDD-based cell uses an uplink and a downlink in a time division manner on one carrier. Therefore, there is a need for a new method for the SRS when the UE performs the CA or the dual connectivity on the FDD-based cell and the TDD-based cell.

Accordingly, other disclosures of the present specification propose methods for solving the aforementioned problem as described below.

<Improved Cell Index Allocation Method According to Second Disclosure of the Present Specification>

First, according to the second disclosure of the present specification, a method of grouping and allocating a cell index on the basis of a frame structure (i.e., whether it is TDD or FDD) and a new method to be taken by a UE in regards to the cell index are proposed. More specifically, the number of uplink and downlink carriers is different in an FDD-based cell and a TDD-based cell, and for this reason, a related operation, information constituting physical channels, or a usage thereof may be different. The FDD-based cell and the TDD-based cell may exist in the same one BS or may exist in different BSs. In this case, a related HARQ-ACK operation or CSI reporting operation or the like may be performed independently. For this reason, the cell index is allocated by distinguishing for the FDD-based cell and the TDD-based cell, and thus an operation to be performed by the UE may be different.

Hereinafter, a method of allocating a cell index by distinguishing for a TDD-based cell and an FDD-based cell will be described with reference to FIG. 14.

Figure 14:
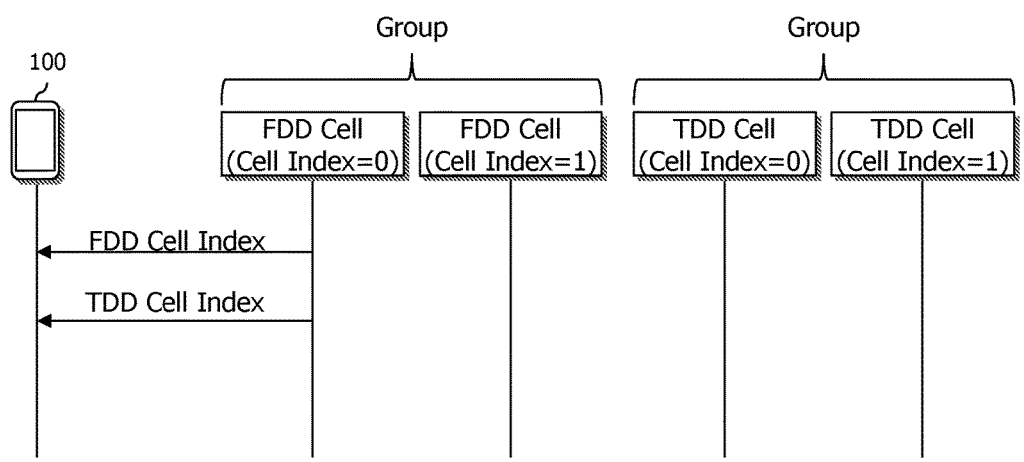
FIG. 14 illustrates an example of an improved cell index allocation method according to a second disclosure of the present specification.

FIG. 14 illustrates an example of an improved cell index allocation method according to a second disclosure of the present specification.

As may be seen with reference to FIG. 14, FDD-based cells are grouped with each other, and TDD-based cells are grouped with each other. Thereafter, a cell index may be assigned within each group. That is, the cell index may be sequentially assigned from 0 within a group consisting of the FDD-based cells, and the cell index may be sequentially assigned from 0 in a group consisting of the TDD-based cells. In other words, the cell index, i.e., ServCellIndex, is assigned from 0 to 7 without overlapping by not distinguishing the FDD-based cell and the TDD-based cell in a method based on the legacy 3GPP standard, whereas according to the second disclosure of the present specification, the cell index is assigned independently within each group. In this case, the cell index may be assigned on the basis of a UL-DL configuration in the group consisting of the TDD-based cells. In addition, an FDD-based specific cell and a TDD-based specific cell are different cells, but may have the same index value. In this case, a cell index 0 may be assigned only for a primary cell without a distinction of TDD/FDD. Alternatively, the cell index 0 may be assigned flexibly within each group. In this case, a cell corresponding to a cell index may be interpreted as a primary cell or a representative secondary cell. The representative secondary cell may be a secondary cell in which a corresponding UE is capable of transmitting a PUCCH.

Meanwhile, a cell index assigned within the group consisting of the TDD-based cells and a cell index assigned within the group consisting of the TDD-based cells may be distinguished by respectively being denoted as ServCellIndex_FDD and ServCellIndex_TDD. It may be interpreted that the ServCellIndex_FDD and the ServCellIndex_TDD perform partitioning on a ServCellIndex set for the legacy system.

As shown in FIG. 14, if a UE 100 has access to an FDD-based specific cell as a primary cell among a group of FDD-based cells and a group of TDD-based cells, ServCellIndex_FDD and ServCellIndex_TDD may be received from the FDD-based specific cell which is the primary cell. Therefore, when the UE 100 performs an operation based on the cell index, it may be performed by considering both of the ServCellIndex_FDD and ServCellIndex_TDD. For example, a cell indicated by any one cell index, i.e., ServCellIndex_FDD or ServCellIndex_TDD, may be accessed by activating the cell as a secondary cell.

Meanwhile, when the UE performs an operation, a priority may be given to ServCellIndex_FDD or ServCellIndex_TDD. The priority may be determined by a higher layer signal. The aforementioned ServCellIndex_FDD and ServCellIndex_TDD are for exemplary purposes only, and other cell indexes, e.g., cellIndex and sCellIndex, may also be distinguished for FDD and TDD. For example, the cellIndex may be distinguished for cellIndex_FDD and cellIndex_TDD, and the sCellIndex may be distinguished for sCellIndex_FDD and sCellIndex_TDD.

Alternatively, unlike the aforementioned description, when assigning the cell index, it may be managed by using common parameters, instead of assigning the cell index by distinguishing for the TDD-based cell and the FDD-based cell. For example, a UE capable of concurrently accessing the FDD-based cell and the TDD-based cell is allowed to have only one type of parameters related to the cell index, i.e., cellIndex, ServCellIndex, and sCellIndex. Instead, when the UE performs an operation or configures a physical channel or the like in regards to the cell index, it may be allowed to utilize information based on the FDD-based cell and the TDD-based cell. Whether to apply this method may be reported to the UE through a higher layer signal. For example, whether it is necessary to distinguish the FDD-based cell and the TDD-based cell may be reported to the UE through the higher layer signal when determining a cell of a PUSCH on which UCI is piggybacked, when determining SRS transmission power, and when determining a UE operation for a CSI collision.

On the other hand, in a situation where the UE concurrently accesses to the FDD-based cell and the TDD-based cell, the UE may receive a higher layer signal for each of the FDD-based cell and the TDD-based cell. As such, when the UE receives the higher layer signal from each of the FDD-based cell and the TDD-based cell, the cell index may be assigned in advance as described above. Meanwhile, alternatively, the UE may receive the higher layer signal including common information of the FDD-based cells and the TDD-based cells. However, as described above, although the UE receives the higher layer signal including the common information of the primary cell, since a carrier is different in TDD and FDD, there may be a situation where the UE can simultaneously transmit a PUCCH and a PUSCH as to the FDD-based cell but cannot simultaneously transmit the PUCCH and the PUSCH as the a TDD-based cell. Therefore, the UE may additionally receive a higher layer signal including information specified for the TDD-based cell. Meanwhile, the aforementioned problem may occur not only in a combination of the FDD-based cell and the TDD-based cell but also in a combination of the FDD-based cell and the FDD-based cell or a combination of the TDD-based cell and the TDD-based cell.

On the other hand, the UE may transmit the PUCCH independently as to a cell group consisting of the FDD-based cells and a cell group consisting of the TDD-based cells. For this, the UE may configure a MAC entity and an RRC entity for each of the group. More specifically, the UE may configure the MAC entity and the RRC entity as to the group of the FDD-based cells, and also may configure the MAC entity and the RRC entity as to the group of the TDD-based cells. In other words, the UE concurrently having access to the FDD-based cell and the TDD-based cell may have an individual MAC entity or RRC entity for each of the FDD-based cell and the TDD-based cell. In this case, the UE may transmit the PUCCH to any one cell of the group of the FDD-based cells, and may transmit again the PUCCH to any one cell of the group of the TDD-based cells. As such, if the PUCCH is transmitted to each of the FDD-based cell and the TDD-based cell, the FDD-based cell may configure an HARQ-ACK configuration on the basis of FDD, and the TDD-based cell may follow a configuration for a situation in which a carrier aggregation (CA) is achieved on cells having different UL-DL configurations.

<Method of Piggybacking UCI on PUSCH According to Third Disclosure of the Present Specification>

According to the existing 3GPP release-11, the entirety or part of UCI is transmitted by being piggybacked not on a PUCCH but on a PUSCH according to a type of the UCI and according to whether it is configured to simultaneously transmit the PUCCH and the PUSCH. For example, if it is configured to simultaneously transmit the PUCCH and the PUSCH and if the UCI includes HARQ-ACK and CSI in a subframe in which the PUCCH and the PUSCH are simultaneously transmitted, the HARQ-ACK is transmitted through the PUCCH and the CSI is transmitted through the PUSCH. Herein, the PUSCH does not correspond to either random access grant or contention based random access procedure, and corresponds to a cell having a lowest cell index, including a primary cell (PCell).

However, if the UCI is piggybacked on the PUSCH as described above, the number of REs allocated to a UL-SCH in the PUSCH is decreased, which may result in a reliability degradation or a restriction on a data amount of the UL-SCH. In general, in case of FDD, uplink transmission is possible in every subframe, whereas in case of TDD, the number of subframes capable of performing uplink transmission is limited. In particular, in the TDD case, there is a UL-DL configuration 5 in which an uplink transmission opportunity is extremely small. Considering these aspects, when an FDD PUSCH and a TDD PUSCH exist at the same time point, it may be effective to transmit the UCI through the FDD PUSCH rather than the TDD PUSCH. Hereinafter, a criterion of selecting a cell of a PUCCH on which the UCI is piggybacked from among a plurality of cells will be described by taking specific examples.

Figure 15:
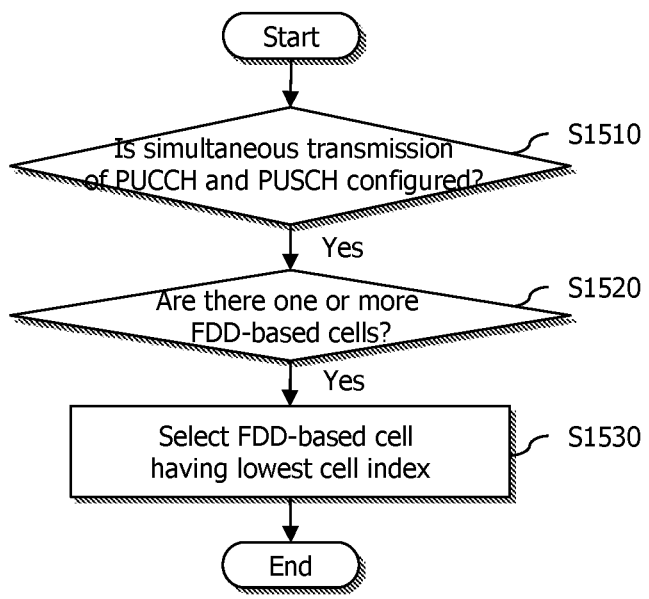
FIG. 15 is a flowchart illustrating an exemplary first method of a third disclosure of the present specification.

FIG. 15 is a flowchart illustrating an exemplary first method of a third disclosure of the present specification.

As may be seen with reference to FIG. 15, when simultaneous transmission of a PUCCH and a PUSCH is configured (S1510), a UE determines whether there are one or more FDD-based cells (S1520). If there are one or more FDD-based cells, an FDD-based cell having a lowest cell index is selected (S1530). In addition, the UE transmits UCI by piggybacking on a PUSCH of the cell. However, if the FDD-based cell does not exist, the UE selects a cell having a lowest cell index from among TDD-based cells, and transmits the UCI by piggybacking on the PUSCH of the selected cell. That is, according to the exemplary first method of the third disclosure, a priority among a plurality of cells may be assigned in the order of: an FDD-based cell>a cell index>a TDD-based cell>a cell index. According to the first method, the UCI is piggybacked on a PUSCH of a cell having a lowest cell index among FDD cells irrespective of a primary cell. However, if the PUSCH does not exist in the FDD-based cell, the UCI may be piggybacked on a PUSCH of a cell having a lowest cell index among TDD cells. For example, even if the primary cell is a TDD-based cell and a PUSCH exists in the cell, the UCI may be piggybacked on the PUSCH of the cell having the lowest cell index among the FDD-based cells. The cell index may be the existing cell index, or may be any one of ServCellIndex_FDD, cellIndex_FDD, and sCellIndex_FDD according to the second disclosure.

On the other hand, there may be other methods (not shown). This will be described as follows.

According to a second method, for selecting a cell of a PUSCH on which UCI will be piggybacked, a priority among a plurality of cells may be assigned in the order of: a primary cell>an FDD-based cell>a TDD-based cell>a cell index. That is, the PUSCH of the primary cell has priority, and if there is no PUSCH of the primary cell, the UCI may be piggybacked on a PUSCH of a cell having a lowest cell index among FDD-based cells. If all FDD-based cells do not have the PUSCH, the UCI may be transmitted on a PUSCH of a cell having a lowest cell index among TDD-based cells. However, if the primary cell is the TDD-based cell and if the PUSCH exists, the UCI may be transmitted by being piggybacked on a PUSCH of a TDD-based cell which is the primary cell.

According to a third method, for selecting a cell of a PUSCH on which the UCI will be piggybacked, a priority among a plurality of cells may be assigned in the order of: a TDD-based cell>a cell index>an FDD-based cell>a cell index. That is, irrespective of the primary cell, the UCI may be transmitted by being piggybacked on a PUSCH having a smallest cell index among TDD-based cells. If all TDD-based cells do not have the PUSCH, the UCI may be transmitted by being piggybacked on a PUSCH of a cell having a lowest cell index among FDD-based cells.

According to a fourth method, for selecting a cell of a PUSCH on which the UCI will be piggybacked, a priority among a plurality of cells may be assigned in the order of: a primary cell>a TDD-based cell>a cell index>an FDD-based cell. The PUSCH of the primary cell has a top priority, and only for a case where the primary cell does not have the PUSCH, the UCI may be transmitted by being piggybacked on a PUSCH of a cell having a lowest cell index among TDD-based cells. If all TDD-based cells do not have the PUSCH, the UCI may be transmitted by being piggybacked on a PUSCH of a cell having a lowest cell index among FDD-based cells.

According to a fifth method, for selecting a cell of a PUSCH on which the UCI will be piggybacked, a priority among a plurality of cells may be assigned in the order of: a primary cell>a cell having higher priority between TDD and FDD>a cell index>a cell having lower priority between TDD and FDD>a cell index. Herein, a priority between TDD and FDD may be reported to the UE through a higher layer signal. In this case, the PUSCH of the primary cell has a top priority, and only for a case where the primary cell does not have the PUSCH, the UCI may be piggybacked on the PUSCH of a cell operating with a higher priority between TDD and FDD. However, if the cell does not have the PUSCH, the UCI may be piggybacked on a PUSCH of a cell operating with a lower priority between TDD and FDD. Herein, if TDD has a higher priority than FDD and if there are a plurality of cells operating with TDD having the higher priority, a cell having a lowest cell index is selected from among the plurality of cells.

According to a sixth method, for selecting a cell of a PUSCH on which the UCI will be piggybacked, a priority among a plurality of cells may be assigned in the order of: the same mode as a primary cell mode (i.e., whether it is TDD or FDD)>a cell index>a mode different from the primary cell mode>cell index. For example, if the primary cell mode is TDD, the UCI may be piggybacked on a PUSCH of a cell having a lowest priority among TDD-based cells. On the other hand, if the primary cell mode is FDD, the UCI may be piggybacked on a PUSCH of a cell having a lowest cell index among FDD-based cells. However, if all corresponding cells operating in the same mode as the primary cell mode do not have the PUSCH, the UCI may be piggybacked on a PUSCH of a cell having a lowest cell index among cells operating in another mode.

According to a seventh method, for selecting a cell of a PUSCH on which the UCI will be piggybacked, a priority among a plurality of cells may be assigned in the order of: a cell having a higher priority between TDD and FDD>a cell index>a cell having a lower priority between TDD and FDD>a cell index. Herein, a priority between TDD and FDD may be reported to the UE through a higher layer signal. According to the seventh method, even if the PUSCH exists in the primary cell, the UCI may be piggybacked according to the preferential mode.

<SRS Transmission Method According to Fourth Disclosure of the Present Specification>

An SRS transmitted by a UE is basically used when a corresponding cell estimates a state of an uplink channel. After estimating the state of the uplink channel, the corresponding cell may allocate an optimal uplink resource to the UE. However, since an uplink and a downlink exist in the same carrier in case of TDD, a state of a downlink channel can also be estimated from the SRS by utilizing a channel reciprocity feature.

However, as described above, according to the first disclosure of the present specification, the UE may concurrently access an FDD-based cell and a TDD-based cell. Therefore, according to the fourth disclosure of the present specification, as one way of decreasing a feedback, a UE having access only to the FDD-based cell may transmit the SRS on a downlink carrier. Accordingly, there may be an SRS for only estimating the uplink channel and an SRS capable of estimating both of the uplink and downlink channels. In this case, a priority may be assigned between the two SRSs according to availability. Although a situation in which the UE performs a carrier aggregation (CA) on an FDD-based cell and a TDD-based cell is described for convenience of explanation, the SRS transmitted to the TDD-based cell may include an SRS transmitted by the UE on a downlink of the FDD-based cell. In addition, in case of TDD, the number of uplink subframes may be limited according to a UL-DL configuration. In this case, TDD may be preferential over FDD due to an opportunity of transmitting the SRS. The priority for the SRS may be used in a process of determining SRS transmission power. Examples thereof will be described in detail as follows.

As a first example, when transmission power scaling is performed on the SRS, FDD/TDD is performed separately. More specifically, maximum transmission power $P_{CMAX}$ of the UE is allocated by dividing into a group of FDD-based cells and a group of TDD-based cells, and transmission power scaling is performed for each group. Optionally, it may be applied after dividing into two groups according to a different criterion instead of dividing into FDD/TDD. An example of the different criterion may be a periodicity of the SRS. The following equation shows an example of the above case.

$$\sum_{c \in FDDcell} w(i) \cdot \hat{P}_{SRS,c}(i) \leq \hat{P}_{CMAX,FDD}(i) \quad \text{[Equation 1]}$$

$$\sum_{c \in TDDcell} w(i) \cdot \hat{P}_{SRS,c}(i) \leq \hat{P}_{CMAX,FDD}(i),$$

As a second example, when transmission power scaling is performed on the SRS, FDD/TDD is performed separately. For example, a scaling factor w(i) is set independently of the FDD and TDD. Optionally, instead of dividing into FDD/TDD, it may also be applied after dividing into two groups according to a different criterion. An example of the different criterion may include a periodicity of the SRS. The following equation shows an example of the above case.

$$\sum_{c \in FDDcell} w_{FDD}(i) \cdot \hat{P}_{SRS,c}(i) + \quad \text{[Equation 2]}$$

$$\sum_{c \in TDDcell} w_{TDD}(i) \cdot \hat{P}_{SRS,c}(i) \leq \hat{P}_{CMAX}(i)$$

As a third example, transmission power of a TDD SRS is preferentially ensured and thereafter transmission power scaling is performed on transmission power of an FDD SRS. Herein, if power consumed in transmission of only the TDD SRS exceeds maximum transmission power of the UE, transmission power scaling may be performed preferentially on the transmission power of the TDD SRS. Optionally, instead of dividing into FDD/TDD, it may be applied after dividing into two groups according to a different criterion. An example of the criterion may be a periodicity of the SRS. An example of performing transmission power scaling for transmission power of an FDD SRS for a case where transmission power of the TDD SRS does not exceed the maximum transmission power of the UE is as follows.

$$\sum_{c \in FDDcell} w(i) \cdot \hat{P}_{SRS,c}(i) \le \left( \hat{P}_{CMAX}(i) - \sum_{c \in TDDcell} \hat{P}_{SRS,c}(i) \right) \quad \text{[Equation 3]}$$

As a third example, transmission power of an SRS corresponding to a frame structure type (i.e., whether it is FDD or TDD) of a primary cell is preferentially ensured and thereafter transmission power scaling is performed on transmission power of other SRSs. Herein, if power consumed in transmission of only the SRS corresponding to the frame structure type of the primary cell exceeds maximum transmission power of the UE, transmission power scaling for the transmission power of the SRS may be preferentially performed.

The aforementioned method of configuring/scaling SRS transmission power may be collectively performed by the UE when a carrier aggregation (CA) is performed on an FDD-based cell and a TDD-based cell.

<Priority Rule for CSI Reporting According to Third Disclosure of the Present Specification>

Conventionally, only one piece of periodic CSI of a UE is allowed in one subframe, and if a plurality of pieces of periodic CSI collide on one subframe, only one is selected according to a priority rule and the others are all dropped. Basically, CSI reporting having top priority is selected according to a CSI reporting type, and if a collision occurs among CSI reports with the same priority, the smaller the csi-ProcessId (in case of a transmission mode (TM) 10), the higher the priority of a corresponding CSI report. Next, if the TM 1 to 9 is used and even the csi-ProcessId is identical, the smaller the cell index, i.e., ServCellIndex, the higher the priority of a corresponding CSI report.

However, as described above, a channel reciprocity feature may be used in TDD to estimate a downlink channel from an SRS, and this may be utilized to replace a CSI report. Therefore, regarding a UE concurrently having access to a TDD-based cell and an FDD-based cell, it is necessary to consider whether it is an FDD/TDD based cell in a dropping rule or in a priority assignment related to the existing CSI report. An example thereof will be described in detail as follows.

As a first example, if CSI reports of a plurality of cells have reporting types with the same priority and have the same csi-ProcessId, a UE determines that a CSI report corresponding to a cell index for an FDD-based cell has a high priority. A process of checking the csi-ProcessId may be limited to a case of the TM 10, and may be skipped in a case of the TMs 1 to 9. This is because the CSI report is only one feedback in FDD, unlike in TDD. Therefore, a cell capable of transmitting an SRS on a downlink carrier among FDD-based cells may be excluded from a group of the FDD-based cells.

As a second method, if CSI reports of a plurality of cells have reporting types with the same priority and have the same csi-ProcessId, the UE assigns a high priority to a CSI report corresponding to a cell index for TDD-based cells. Herein, the process of checking the csi-ProcessId may be performed only in a case of the TM 10, and may be skipped in a case of the TMs 1 to 9. Meanwhile, this method has an advantage in that CSI can be provided more accurately to an eNB in TDD by integrating CSI reports and downlink channel estimations depending on the SRS.

As a third method, if CSI reports of a plurality of cells have reporting types with the same priority and have the same csi-ProcessId, the UE assigns a high priority to a CSI report corresponding to ServCellIndex of cells having the same frame structure type as the frame structure type (i.e., whether it is TDD or FDD) of the primary cell. Herein, the process of checking the csi-ProcessId may be performed only in a case of the TM 10, and may be skipped in a case of the TMs 1 to 9.

In the aforementioned methods, a process of considering FDD/TDD is added in a step of comparing the ServCellIndex. As another method, FDD/TDD may be considered in a step of comparing the csi-ProcessId or a step of comparing a CSI reporting type or a further previous step. For example, if a UE configures an MAC entity or an RRC entity for each of an FDD-based cell and a TDD-based cell, the comparison may be achieved for each group of the FDD-based cells or group of the TDD-based cells starting from the process of comparing the CSI reporting type. For example, if all cells have different priorities of CSI reporting types and TDD-based cells have the same priority of the CSI reporting types, processes subsequent to the process of comparing the CSI reporting type may be performed as to the TDD-based cell. An example of a method of considering whether it is an FDD-based cell or a TDD-based cell before considering a CSI reporting type is described below in detail.

As a first example, if CSI reports for a plurality of cells collide in the same subframe, the UE assigns a high priority to FDD-based cells before comparing CSI reporting types with each other. In this case, CSI reporting for TDD-based cells may be dropped.

As a second example, when CSI reports for a plurality of cells collide in the same subframe, the UE assigns a high priority to TDD-based cells before comparing CSI reporting types with each other. In this case, CSI reporting of FDD-based cells may be dropped.

As a third example, if CSI reports for a plurality of cells collide in the same subframe, the UE assigns a high priority to a cell having the same frame structure as a frame structure type (i.e., whether it is TDD or FDD) of a primary cell before comparing CSI reporting types with each other. In this case, CSI reporting for a group of the remaining cells may be dropped.

As a fourth example, when CSI reports for a plurality of cells collide, the UE assigns a high priority to a group of specific cells before comparing CSI reporting types with each other. The cell group may be configured through a higher layer signal. In this case, CSI reporting for a group of the remaining cells may be dropped.

Figure 16:
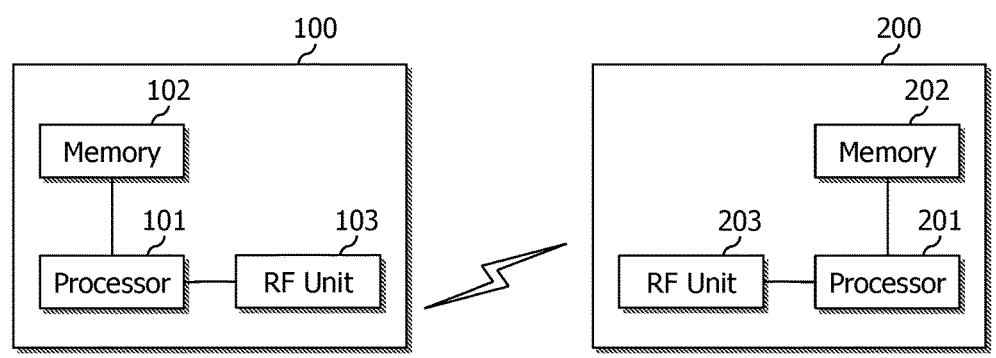
FIG. 16 is a block diagram of a wireless communication system according to a disclosure of the present specification.

The aforementioned embodiments of the present invention can be implemented through various means. For example, the embodiments of the present invention can be implemented in hardware, firmware, software, combination of them, etc. Details thereof will be described with reference to the drawing FIG. 16 is a block diagram of a wireless communication system according to a disclosure of the present specification.

ABS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

A UE 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for concurrently accessing a plurality of cells, the method performed by a user equipment (UE) and comprising:
    setting a connection with any one cell corresponding to a primary cell among frequency division duplex (FDD)-based cells and time division duplex (TDD)-based cells;
    receiving, from the any one cell, first cell indexes for the FDD-based cells and second cell indexes for the TDD-based cells; and
    setting a connection with a secondary cell indicated by any one index among the first cell indexes and the second cell indexes,
    wherein at least one value among the first cell indexes overlaps with at least one value of the second cell indexes.

2. The method of claim 1, wherein a value of a cell index for the primary cell is zero (0), which does not overlap with the first cell indexes and the second cell indexes.

3. The method of claim 1, further comprising:
    when simultaneous transmission of a physical uplink control channel (PUCCH) and a physical uplink shared channel (PUSCH) is configured, determining whether there are one or more connected FDD-based cells; and
    when there are one or more connected FDD-based cells, performing transmission by including the entirety or part of uplink control information (UCI) on a PUSCH of an FDD-based cell having a lowest cell index among the first cell indexes.

4. The method of claim 1, further comprising:
    when a sounding reference signal (SRS) is transmitted to the FDD-based cells and the TDD-based cells, distributing determined maximum transmission power to the FDD-based cells and the TDD-based cells;
    scaling transmission power distributed for the FDD-based cells; and
    scaling transmission power distributed for the TDD-based cells.

5. The method of claim 1, further comprising:
    when a sounding reference signal (SRS) is transmitted to the FDD-based cells and the TDD-based cells, allocating determined maximum transmission power to the TDD-based cells; and
    allocating remaining transmission power to the FDD-based cells after a previous allocation.

6. The method of claim 1, further comprising:
    when a channel state information (CSI) report to be transmitted to the FDD-based cells and a CSI report to be transmitted to the TDD-based cells collide on one subframe, dropping the CSI report to be transmitted to the TDD-based cells, and transmitting the CSI report to the FDD-based cells.

7. A user equipment (UE) capable of concurrently accessing a plurality of cells, the UE comprising:
    a wireless transceiver; and
    a processor configured to:
        control the wireless transceiver to set a connection with any one cell corresponding to a primary cell among frequency division duplex (FDD)-based cells and time division duplex (TDD)-based cells,
        control the wireless transceiver to receive, from the any one cell, first cell indexes for the FDD-based cells and second cell indexes for the TDD-based cells, and
        control the wireless transceiver to configure a connection with a secondary cell indicated by any one index among the first cell indexes and the second cell indexes,
        wherein at least one value among the first cell indexes overlaps with at least one value of the second cell indexes.

8. The UE of claim 7, wherein a value of a cell index for the primary cell is zero (0), which does not overlap with the first cell indexes and the second cell indexes.

9. The UE of claim 7, wherein the processor is further configured to:
    determine whether there are one or more connected FDD-based cells, when simultaneous transmission of a physical uplink control channel (PUCCH) and a physical uplink shared channel (PUSCH) is configured; and
    perform transmission by including the entirety or part of uplink control information (UCI) on a PUSCH of an FDD-based cell having a lowest cell index among the first cell indexes, when there are one or more connected FDD-based cells.

10. The UE of claim 7, wherein the processor is further configured to:

when a sounding reference signal (SRS) is transmitted to the FDD-based cells and the TDD-based cells, distribute determined maximum transmission power to the FDD-based cells and the TDD-based cells, scale transmission power distributed for the FDD-based cells, and scale transmission power distributed for the TDD-based cells.

11. The UE of claim 7, wherein the processor is further configured to:

when a sounding reference signal (SRS) is transmitted to the FDD-based cells and the TDD-based cells, allocate determined maximum transmission power to the TDD-based cells, and allocate remaining transmission power to the FDD-based cells after a previous allocation.

12. The UE of claim 7, wherein the processor is further configured to:

when a channel state information (CSI) report to be transmitted to the FDD-based cells and a CSI report to be transmitted to the TDD-based cells collide on one subframe, drop the CSI report to be transmitted to the TDD-based cells, and transmit the CSI report to the FDD-based cells.

\* \* \* \* \*